(12) United States Patent
Ogawa (10) Patent No.: US 9,487,208 B2
(45) Date of Patent: Nov. 8, 2016

(54) TRAVEL SUPPORT DEVICE, TRAVEL SUPPORT METHOD, AND DRIVE SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/758,728

(22) PCT Filed: Oct. 7, 2014

(86) PCT No.: PCT/JP2014/005107
§ 371 (c)(1),
(2) Date: Jun. 30, 2015

(87) PCT Pub. No.: WO2015/052921
PCT Pub. Date: Apr. 16, 2015

(65) Prior Publication Data
US 2016/0207521 A1 Jul. 21, 2016

(30) Foreign Application Priority Data
Oct. 9, 2013 (JP) .................................. 2013-211814

(51) Int. Cl.
*B60W 20/00* (2016.01)
*B60W 50/00* (2006.01)
(Continued)

(52) U.S. Cl.
CPC .............. *B60W 20/13* (2016.01); *B60K 6/442* (2013.01); *B60W 10/06* (2013.01); *B60W 10/08* (2013.01); *B60W 10/26* (2013.01); *B60W 20/12* (2016.01); *B60W 20/40* (2013.01); *B60W 50/0097* (2013.01); *G01C 21/34* (2013.01);
(Continued)

(58) Field of Classification Search
CPC ...... B60L 3/0046; B60L 11/14; B60L 15/20; B60L 3/023; B60L 11/123; F16K 13/74; B60W 20/13; B60W 10/06; B60W 10/08; B60W 50/0097; B60W 10/26; B60W 20/40; B60W 2550/16; B60K 6/543; B60K 6/54; B60K 6/365; B60K 6/445; Y10S 903/93; F02N 7/00
See application file for complete search history.

(56) References Cited

U.S. PATENT DOCUMENTS 6,247,437 B1 * 6/2001 Yamaguchi ............ B60K 6/445
123/179.3
(Continued)

FOREIGN PATENT DOCUMENTS

| JP | 2008-247318 A | 10/2008 |
|---|---|---|
| JP | 2010-274687 A | 12/2010 |
| JP | 2014-151760 A | 8/2014 |

*Primary Examiner* — Behrang Badii
(74) *Attorney, Agent, or Firm* — Oliff PLC (57) ABSTRACT

A travel support device includes a mode planner that plans a travel mode that is to be one of an EV mode and an HV mode that uses at least an internal combustion engine as a drive source, for each of a plurality of sections, and an execution determiner that determines to execute a travel mode planning with the mode planner on condition that the total amount of consumption energy required for traveling the travel route is larger than an energy equivalent value that is obtained by adding a first allowance value to a remaining charge of the battery. In executing a planning based on the determination by the execution determiner, the mode planner executes the travel mode planning while assuming that energy from which energy corresponding to a second allowance value, which is smaller than the first allowance value is excluded is energy required for travelling the travel route.

6 Claims, 3 Drawing Sheets

(51) Int. Cl.
 *B60W 10/06* (2006.01)
 *B60W 10/08* (2006.01)
 *B60W 10/26* (2006.01)
 *B60K 6/442* (2007.10)
 *G01C 21/34* (2006.01)

(52) U.S. Cl.
 CPC .... *B60W 2510/244* (2013.01); *B60W 2530/16* (2013.01); *B60W 2550/143* (2013.01); *B60W 2550/402* (2013.01); *B60Y 2200/92* (2013.01); *B60Y 2300/182* (2013.01); *Y02T 10/6291* (2013.01); *Y02T 10/84* (2013.01); *Y10S 903/93* (2013.01)

(56) References Cited

U.S. PATENT DOCUMENTS

| | | | | |
|---|---|---|---|---|
| 6,460,500 | B1* | 10/2002 | Ooyama | F02N 7/00 123/179.3 |
| 8,308,595 | B2* | 11/2012 | Noda | B60L 3/0023 475/116 |
| 2010/0234174 | A1* | 9/2010 | Miyazaki | B60K 6/387 477/5 |
| 2012/0247911 | A1* | 10/2012 | Noda | B60L 3/0023 192/113.32 |
| 2014/0358352 | A1* | 12/2014 | Yamamoto | B60L 3/0046 701/22 |

* cited by examiner

TRAVEL SUPPORT DEVICE, TRAVEL SUPPORT METHOD, AND DRIVE SUPPORT SYSTEM

TECHNICAL FIELD

The present invention relates to a travel support device that manages adaptation of a plurality of travel modes of a vehicle, a travel support method, and a drive support system having a travel support function.

BACKGROUND ART

Conventionally, as a vehicle provided with a plurality of travel modes as described above, a hybrid vehicle that uses both an internal combustion engine and a motor as its drive sources is known. The hybrid vehicle has a plurality of travel modes including a mode that uses only the internal combustion engine or both the internal combustion engine and the motor (HV mode), and a mode that uses only the motor to travel by stopping the internal combustion engine (EV mode). Further, a travel support device that includes a navigation system and the like to be installed in the hybrid vehicle performs support such as calculating a travel route from a current location to a destination based on information such as map information and road traffic information, and selecting a travel mode to be adapted to each of sections that are to be dividing units of the travel route. For example, Patent Document 1 discloses an example of a controller of a vehicle having such a travel support function.

CITATION LIST

Patent Literature

PTL 1: Japanese Laid-Open Patent Publication No. 2010-274687

SUMMARY OF INVENTION

Technical Problem

Incidentally, in a controller of a vehicle described in Patent Document 1, travel modes of the respective sections in a travel route are set by considering the entire energy balance of the travel route so that the remaining charge of the battery, which is a secondary battery, becomes zero at the destination. However, the prediction may be incorrect depending on factors such as changes in the traffic flow, and the remaining charge of the battery may decrease faster than the prediction. In such a case, the battery runs out in the middle of a section planned to be in the EV mode, and uncomfortableness may be sensed by a driver. Thus, estimating larger decrease of the battery may be considered to account for incorrectness of the prediction. In this case, the remaining charge of the battery may not become zero at the destination.

Such a problem is a common problem in general for devices and methods that assign travel modes to a vehicle having a plurality of travel modes with different energy balance.

An objective of the present invention is to provide a travel support device and a travel support method that are capable of promoting adjustment in battery consumption in a travel route, and a drive support system having these travel support functions.

Solution to Problem

To achieve the foregoing objective and in accordance with a first aspect of the present invention, a travel support device is provided that supports a vehicle having an internal combustion engine and a motor, which uses a battery, as drive sources to move from a current location to a destination. A travel route from the current location to the destination is divided into a plurality of sections. Travel modes of the vehicle include an EV mode, which uses the motor as the drive source, and an HV mode, which uses at least the internal combustion engine as the drive source. A road load for traveling each section in the EV mode is set. The travel support device includes a mode planner that plans, for each section, the travel mode by selecting one of the EV mode and the HV mode and an execution determiner that determines to execute a travel mode planning with the mode planner on condition that a total amount of consumption energy required for traveling the travel route is larger than an energy equivalent value that is obtained by adding a first allowance value to a remaining charge of the battery. In executing a planning based on the determination by the execution determiner, the mode planner executes the travel mode planning while assuming that energy from which energy corresponding to a second allowance value, which is smaller than the first allowance value is excluded, is energy required for travelling the travel route.

To achieve the foregoing objective and in accordance with a second aspect of the present invention, a travel support method is provided for supporting a movement of a vehicle having an internal combustion engine and a motor, which uses a battery, as drive sources from a current location to a destination. A travel route from the current location to the destination is divided into a plurality of sections. Travel modes of the vehicle include an EV mode, which uses the motor as the drive source, and an HV mode, which uses at least the internal combustion engine as the drive source. A road load for traveling each section in the EV mode is set. The travel support method includes: planning the travel mode by selecting one of the EV mode and the HV: prior to the planning the travel mode, determining to execute a travel mode planning on condition that a total amount of consumption energy required for traveling the travel route is larger than an energy equivalent value that is obtained by adding a first allowance value to a remaining charge of the battery; and in executing a planning based on the condition, executing the travel mode planning while assuming that energy from which energy corresponding to a second allowance value, which is smaller than the first allowance value is excluded, is energy required for travelling the travel route.

To achieve the foregoing objective and in accordance with a third aspect of the present invention, a drive support system is provided that supports driving of a vehicle based on one travel mode selected from among a plurality of different travel modes, the selected mode having been planned for each of a plurality of sections that are obtained by dividing a travel route from a current location to a destination of the vehicle including an internal combustion engine and a motor as drive sources. The drive support system includes the travel support device according to the first aspect of the present invention as a travel support device for planning the one travel mode selected from among the plurality of travel modes for each section of the travel route.

DESCRIPTION OF EMBODIMENTS

Hereinbelow, a travel support device, a travel support method, and a drive support system according to one embodiment will be described with reference to FIGS. 1 to 4. The travel support device, the travel support method, and the drive support system of the present embodiment are adapted to a hybrid vehicle that uses an electric motor, which uses a battery consisting of a secondary battery as a power source, and an internal combustion engine, which uses gasoline or other fuel as a power source, as drive sources.

Figure 1:
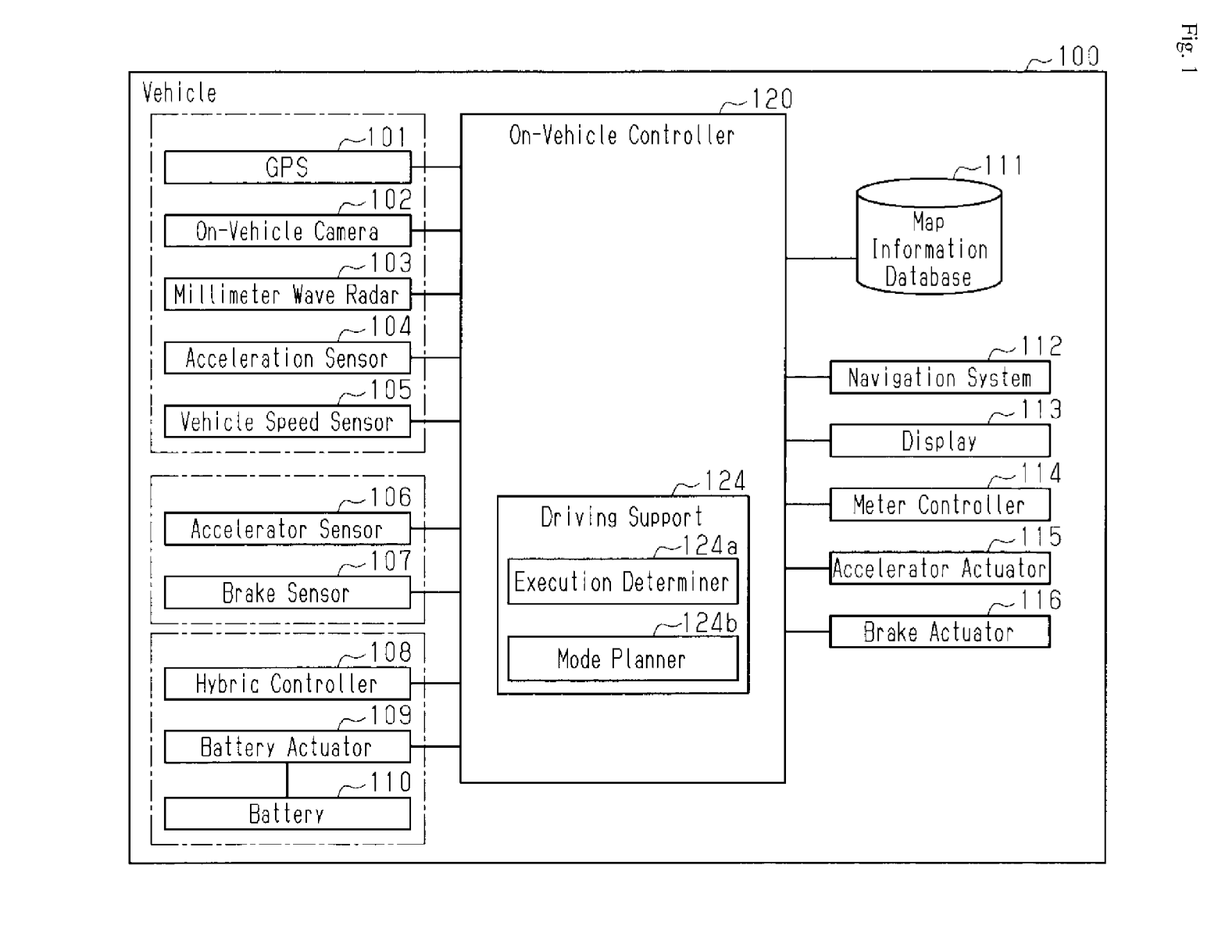
FIG. 1 is a block diagram showing a schematic configuration of a travel support device according to one embodiment.

As shown in FIG. 1, a vehicle 100 according to the present invention has as means for detecting a traveling state of the vehicle 100, for example, a GPS 101, on-vehicle camera 102, a millimeter wave radar 103, an acceleration sensor 104, a vehicle speed sensor 105, and the like. The GPS 101, the on-vehicle camera 102, the millimeter wave radar 103, the acceleration sensor 104, and the vehicle speed sensor 105 are connected to an on-vehicle controller 120, which exerts various vehicle controls and the like via an on-vehicle network such as a control area network (CAN). Further, the on-vehicle controller 120 is an electronic control unit (ECU), and includes a small computer including an arithmetic device and a storage device (memory). The on-vehicle controller 120 can perform various control processes by executing programs stored in the storage device, and calculating parameters with the arithmetic device.

The GPS 101 receives a GPS satellite signal for detecting the absolute location of the vehicle 100, and detects the latitude and longitude of the vehicle 100 based on the received GPS satellite signal. The GPS 101 outputs location information, which is information indicating the detected latitude and longitude of the vehicle 100, to the on-vehicle controller 120. The on-vehicle camera 102 images the surrounding environment of the vehicle 100 and outputs image formed from image data to the on-vehicle controller 120. The millimeter wave radar 103 detects, for example, the presence of an object in the vicinity of the vehicle 100 by using radio waves in the millimeter wave band and outputs a signal corresponding to the result of this detection to the on-vehicle controller 120.

The acceleration sensor 104 detects the acceleration of the vehicle 100 and outputs a signal corresponding to the detected acceleration to the on-vehicle controller 120. The vehicle speed sensor 105 detects the rotating speed of a wheel of the vehicle 100 and outputs a signal corresponding to the detected rotating speed to the on-vehicle controller 120.

An accelerator sensor 106 detects the degree of accelerator operation, which is changed by an accelerator pedal operation performed by the driver, and outputs a signal corresponding to the degree of accelerator operation to the on-vehicle controller 120. A brake sensor 107 detects the degree by which a brake pedal is depressed by the driver, and outputs a signal corresponding to this detected degree of depression, to the on-vehicle controller 120.

The vehicle 100 is also provided with an accelerator actuator 115, which controls the driving state of the engine, and a brake actuator 116, which controls the brake. The accelerator actuator 115 and the brake actuator 116 are electrically connected to the on-vehicle controller 120. The accelerator actuator 115 controls the engine based on a control amount for the engine, which is calculated by the on-vehicle controller 120, according to the detection value of the accelerator sensor 106. The brake actuator 116 controls the brake based on a control amount for the brake, which is calculated by the on-vehicle controller 120, according to the detection value of the brake sensor 107.

Further, the vehicle 100 includes a battery 110, which is a power source of an electric motor serving as a drive source, and a battery actuator 109, which controls charge/discharge of the battery 110. The battery actuator 109 is electrically connected to the on-vehicle controller 120. The battery actuator 109 manages the state of the battery 110 such as the charge/discharge state. Further, the battery actuator 109 drives the electric motor by controlling the discharge of the battery 110, and charges the battery 110 by regeneration of the electric motor.

Additionally, the vehicle 100 is provided with a hybrid controller 108, which controls the respective driving states of the drive sources, or the engine and the motor. The hybrid controller 108 is electrically connected to the on-vehicle controller 120. That is, the hybrid controller 108 is electrically connected to the battery actuator 109, the accelerator actuator 115, and the brake actuator 116 via the on-vehicle controller 120. Further, the hybrid controller 108 is also an ECU, and includes a small computer including an arithmetic device and a storage device. The hybrid controller 108 can perform various control processes s by executing programs stored in the storage device, and calculating parameters by the arithmetic device.

Based on, for example, the detection results of the acceleration sensor 104, the vehicle speed sensor 105, and the accelerator sensor 106 input from the on-vehicle controller 120, the hybrid controller 108 determines driving force distribution of the internal combustion engine and the electric motor, or an output ratio. Particularly, the hybrid controller 108 adjusts the remaining charge of the battery 110 that is an energy remaining charge of the battery by changing the driving force distribution of the internal combustion engine and the electric motor.

Based on the driving force distribution, the hybrid controller 108 generates a control instruction for the battery actuator 109 related to discharge and the like of the battery 110, and information related to a control amount for the internal combustion engine to be calculated by the on-vehicle controller 120. Further, the hybrid controller 108 determines distribution of braking force of the brake and the electric motor based, for example, on detection results of the acceleration sensor 104, the vehicle speed sensor 105, and the brake sensor 107 input from the on-vehicle controller 120. The hybrid controller 108 generates a control instruction for the battery actuator 109 related to the charge and the like of the battery 110 and information related to a control amount for the brake to be calculated by the on-vehicle controller 120 based on the braking force distribution. That is, the hybrid controller 108 controls the charge/discharge of the battery 110 by outputting the generated control instructions to the battery actuator 109. Due to this, the electric motor, which uses the battery 110 as the power source (electric power source), is driven by the discharge of the battery 110, and the battery 110 is charged by the regeneration of the electric motor. Further, the on-vehicle controller 120 can monitor executing states of a hybrid control, and charged rate of the battery 110.

The vehicle 100 according to the present embodiment has, for example, an EV mode, in which the vehicle 100 runs with the motor as a drive source, and an HV mode, in which the vehicle 100 runs with a motor and an engine as drive sources. The hybrid controller 108 according to the present embodiment exerts control in which switching between the EV mode and the HV mode is executed according to, for example, the result of selection made by the driver of the vehicle 100. Additionally, the hybrid controller 108 according to the present embodiment has, for example, an automatic switching function for the EV mode and the HV mode, and exerts control for switching between the EV mode and the HV mode based on information indicating the travel route of the vehicle 100 and/or movement cost taken for the travel route, which is input from the on-vehicle controller 120. A road load is the amount of load amount per unit distance in respective sections, and is an average load amount required for travelling a section. An accumulated value of the road load required in completely traveling the section is defined as consumption energy.

The vehicle 100 is provided with a map information database 111, in which map data are registered. The map data are data related to geography such as roads. Information related to locations such as latitude and longitude is registered together with data by which the geography can be displayed in the map data. Further, the map data may have at least one of intersection names, road names, district names, directional guides, facility information, and the like registered therein.

Further, the map information database 111 includes node data that is information related to nodes indicating locations on roads, and link data that is information related to links as sections between two nodes. A node is set on the road at a location of a specific traffic element such as an intersection, a signal, a curve, and the like, and at a location where the number of lanes is changed. The node data includes location information of nodes, and road information of the locations. A link is set as a section between two nodes, which is divided by the two nodes. The link data includes information of the two nodes, and road information of the section of the link. The road load can be acquired or calculated from road load information included in the link data. The road information of the section of the link includes information such as a starting point, an ending point, a distance, a route, and undulations. Further, the link data may include various types of data, such as cost data including the road load of the section of the link, road data including road types, mark data indicating a specific location, intersection data indicating information of an intersection, and facility data indicating information of a facility.

Among these, the node data is composed of, for example, data indicating: node characteristics such as: node IDs, which are identification numbers of nodes; coordinates of nodes; link IDs of all links connected to the nodes; node types indicating the types of intersections, junctions, and the like; and image IDs that are identification numbers of images representing the nodes.

The link data are composed of, for example, data indicating: link IDs, which are identification numbers of the links; link lengths; node IDs of nodes connecting to initial points and terminal points; road types such as highways, toll roads, ordinary roads, urban/suburban roads, and mountain roads; road widths; the number of lanes; traveling times along links; legal traveling speeds; and road gradient. Moreover, the link data may include data indicating averages, maximum values, minimum values, and the like of moving time, moving speed, consumed fuel amount, and consumed power amount, and the like as road load information that is a required output of the vehicle 100 in each link. The consumed power amount is a power amount that is consumed by the electric motor when the vehicle 100 travels in the EV mode. The road load of the link (section) is acquired or calculated based on such road load information. The road load is an average value in a link (section), and a unit of the road load is [kW]. Further, the consumption energy as the accumulated value of the road load required in completely traveling the link can be calculated from the road load and a link length (section length).

The vehicle 100 has a navigation system 112, which provides route guidance or the like. The navigation system 112 acquires the current location point (latitude and longitude) of the vehicle 100 from the on-vehicle controller 120 in which a detection result of the GPS 101 is input. When a destination is set by the driver, the navigation system 112 specifies the latitude and longitude of this destination. The navigation system 112 obtains the latitude and longitude information of the current location of the vehicle 100 from the on-vehicle controller 120, to which the detection result of the GPS 101 is input. Then, referring to the map information database 111, the navigation system 112 searches one or more travel routes from the current location of the vehicle 100 to its destination. The navigation system 112 also calculates, for example, the road load, the moving time, the moving speed, the fuel consumption, and the electricity consumption for one or more travel routes searched. Then, the navigation system 112 outputs information indicating the travel route/routes searched and the road load, the moving time, the moving speed, the fuel consumption, and the electricity consumption calculated, to a display 113 provided in the passenger compartment and formed from a liquid crystal display and the like.

Additionally, the vehicle 100 is provided with a meter controller 114, which controls the display states of meters displayed on an instrument panel provided on a dashboard. The meter controller 114 obtains data indicating, for example, the charged and discharged states and the like of the battery 110 from the on-vehicle controller 120, and visually displays, for example, an energy flow in the vehicle 100 based on the obtained data. The energy flow is a flow of energy in the vehicle 100 that is generated by the charge/discharge of the battery 110, and the driving force/regeneration of the electric motor. The energy flow may include a flow of energy in the vehicle 100 generated by the driving force of the internal combustion engine.

When the travel route is input, the on-vehicle controller 120 assigns travel modes to each section of the travel route. The on-vehicle controller 120 includes a driving support 124, which supports the assignment of the travel modes corresponding to the travel route. The driving support 124 acquires the travel route information to the destination point set by the driver from the navigation system 112. The driving support 124 includes an execution determiner 124a, which determines whether or not to execute a travel mode planning on a section of the travel route based on the acquired travel route information. The execution determiner 124a configures a part of the travel support device, and its function is exhibited by execution process and the like of a program in the on-vehicle controller 120. The execution determiner 124a has a function to determine to execute the travel mode planning for the section of the travel route on condition that a consumption energy total amount is greater than an energy equivalent value obtained by adding a first allowance value to the remaining charge of the battery 110. The first allowance value is an energy amount that is set such that the remaining charge of the battery 110 does not remain at the destination. That is, the first allowance value is a margin for estimating the remaining charge of the battery 110 to be larger than the actual remaining charge by adding it to the remaining charge of the battery 110.

Further, the driving support 124 includes a mode planner 124b, which executes planning of travel mode to be assigned to the sections of the acquired travel route. The mode planner 124b configures a part of the travel support device, and its function is exhibited by execution process and the like of a program in the on-vehicle controller 120. The mode planner 124b has a function to plan the travel modes of the sections corresponding to the road loads of the respective sections in the travel route.

Generally, efficiency tends to improve by adapting the traveling by the electric motor to a section having a small road load. Further, the efficiency tends to improve by adapting the traveling by the internal combustion engine to a section having a large road load. Thus, the on-vehicle controller 120 assigns the EV mode to a section having a small road load, and assigns the HV mode to a section having a large road load.

The mode planner 124b plans a travel mode such that travel modes of one or more sections close to the destination are set to the HV mode, and the HV mode or the EV mode is selected for sections other than the aforementioned, based on a second allowance value. The second allowance value is an energy amount that is set to suppress deviation from a predetermined consumption energy. That is, the second allowance value is a margin for estimating the travel route to be shorter than actual by subtracting the second energy from the consumption energy total amount.

The mode planner 124b plans the travel mode such that the travel modes of one or more sections close to the destination with a small sum of consumption energy than the second allowance value are set to the HV mode, and the HV mode or the EV mode is selected for sections other than the aforementioned. Among a plurality of target sections, the mode planner 124b assigns the EV mode to sections in ascending order of road load by comparing the road loads of those sections. Further, the mode planner 124b accumulates the consumption energy of the sections to which the EV mode was assigned, and subtracts the same from the remaining charge of the battery 110. Then, the mode planner 124b continues assigning the EV mode to each section of the travel route so that the accumulated consumption energy does not exceed the remaining charge of the battery 110. Due to this, the mode planner 124b assigns the EV mode to the sections having a relatively low road load among the sections of the travel route. Further, the mode planner 124b assigns the HV mode to the sections to which the EV mode is not assigned.

The mode planner 124b outputs the travel modes planned for each of the sections of the travel route as above to the display 113, and displays the planned travel mode of the traveling section on the display 113.

The hybrid controller 108 identifies the section where the vehicle 100 is currently traveling by suitably acquiring currently traveling location information from the on-vehicle controller 120, and causes the vehicle 100 to travel in the travel mode planned for the identified section. That is, the hybrid controller 108 switches the travel mode of the vehicle 100 to the EV mode or the HV mode assigned to the section each time the travel route of the vehicle 100 changes. Due to this, the vehicle 100 travels in the travel mode planned for the section where the vehicle 100 is currently traveling.

Incidentally, in attempting to cope with an error in prediction caused by change in the traffic flow and the like only by the second allowance value, which is used by the mode planner 124b, there is a risk that the following problem may occur. For example, when the second allowance value is set to a relatively large value, the remaining charge of the battery 110 may run out at a position remote from the destination, which may cause uncomfortable sensation to the driver. In contrast, when the second allowance value is set to a relatively small value, a decrease in the remaining charge of the battery 110 is suppressed upon a warm up, so there is a risk that the remaining charge of the battery 110 may be in excess. That is, a mere change in the second allowance value may not be enough to cope with the above problem.

Thus, in the present embodiment, the first allowance value, which is used by the execution determiner 124a in determination, is set to a value larger than the second allowance value, which is used by the mode planner 124b in the planning The execution determiner 124a determines execution of the travel mode planning based on whether or not the total amount of the consumption energy of all of the sections in the travel route is larger than the sum of the remaining charge of the battery 110 and the first allowance value. The execution determiner 124a determines to execute the travel mode planning when the total amount of the consumption energy of all of the sections in the travel route is larger than the sum of the remaining charge of the battery 110 and the first allowance value. Further, the mode planner 124b executes the travel mode planning on each section of the travel route when the execution determiner 124a determined to execute the travel mode planning. In contrast, the execution determiner 124a determines not to execute the travel mode planning when the total amount of the consumption energy of all of the sections in the travel route is not larger than the sum of the remaining charge of the battery 110 and the first allowance value.

Next, an example of the travel route that is to be the target of the travel mode planning as aforementioned will be described with reference to FIG. 2.

Figure 2:
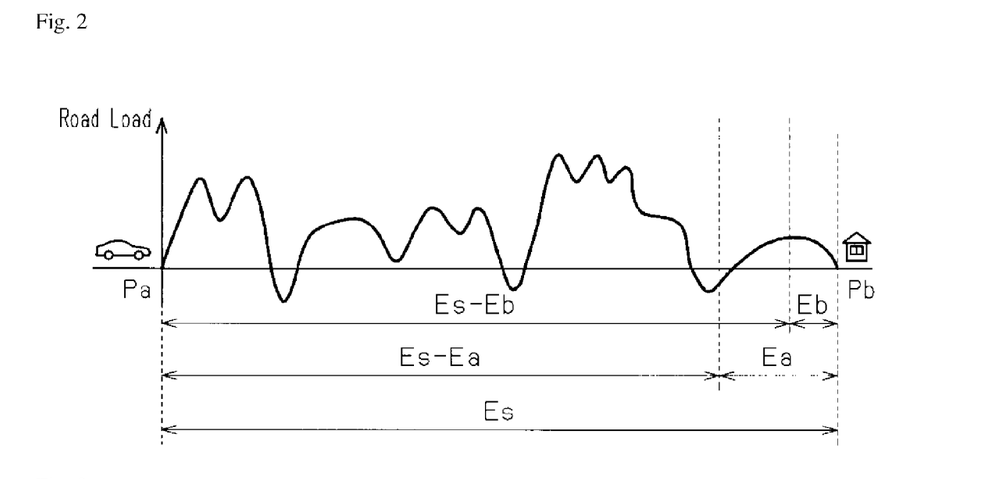
FIG. 2 is a diagram exemplifying a part of a travel route to be planned by the travel support device of the embodiment.

As shown in FIG. 2, a travel route (current location Pa to destination Pb) searched by the navigation system 112 includes a plurality of sections having different road loads. Further, information related to the road load, consumption energy and the like of each section of the travel route is assumed to have been obtained from the map information database 111. Further, the total amount of the consumption energy of all of the sections in the travel route is denoted by Es. Further, the first allowance value, which is used by the execution determiner 124a in the determination, is defined as Ea. Moreover, the second allowance value, which is used by the mode planner 124b in the planning, is defined as Eb. In other words, the energy of the entire travel route used in the execution determination is (Es−Ea). Further, the energy of the entire travel route used in the mode planning is (Es−Eb). Thus, the execution determiner 124a determines the execution of the travel mode planning based on the total amount Es of the consumption energy of all of the sections in the travel route, the remaining charge of the battery 110, and the first allowance value Ea. Further, the mode planner 124b executes the travel mode planning based on the consumption energy of each section in the travel route, the second allowance value Eb, and the road load of each section in the travel route.

Figure 3:
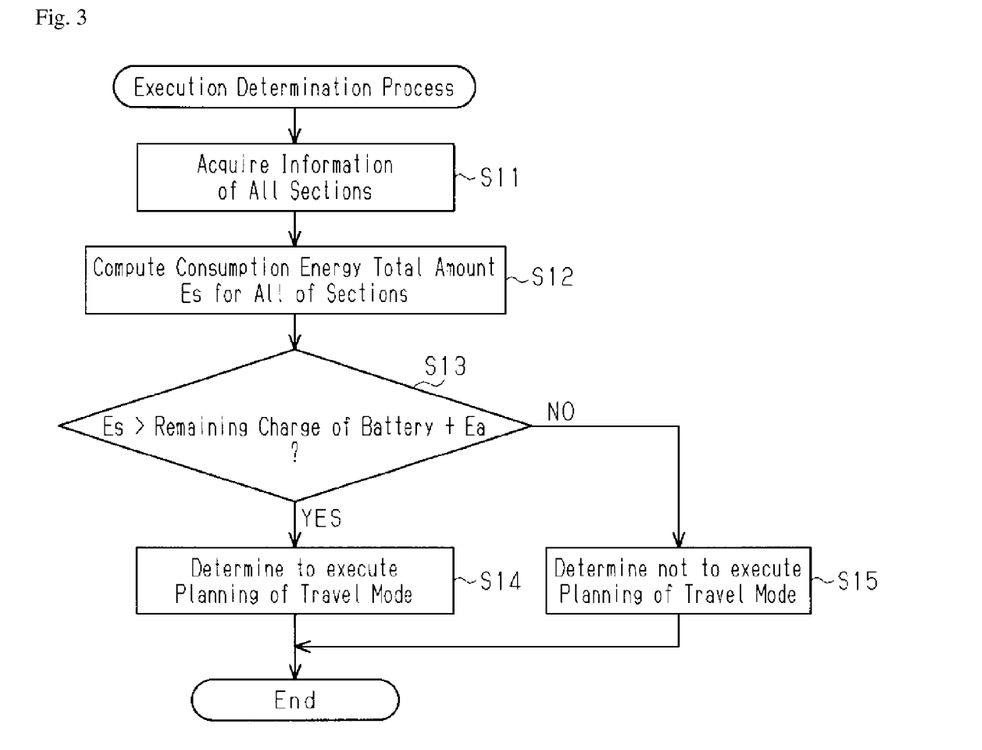
FIG. 3 is a flowchart showing an execution determination process of a travel mode plan by the travel support device of the embodiment.

Next, operation of the present embodiment will be described with reference to FIGS. 3 and 4.

Firstly, by referring to FIG. 3, an example of a determination process of the execution of the travel mode planning for each section in the travel route in the driving support 124 will be described. Each time a travel route is transmitted from the navigation system 112, the driving support 124 performs the determination on the execution of the travel mode planning on each section in the travel route. The execution determiner 124a of the driving support 124 determines whether or not the mode planner 124b is to execute the travel mode planning As shown in FIG. 3, the execution determiner 124a acquires route information of all sections in a travel route when a destination point is set by the navigation system 112 (step S11). Then, the execution determiner 124a computes the consumption energy total amount Es based on the acquired information of all of the sections (step S12), and determines whether or not the consumption energy total amount Es of all of the sections is greater than the sum of the remaining charge of the battery 110 and the first allowance value Ea (step S13). In a case of determining that the consumption energy total amount Es of all of the sections is not larger than the sum of the remaining charge of the battery 110 and the first allowance value Ea (step S13: NO), the execution determiner 124a determines not to execute the travel mode planning (step S15), and ends the determination on the execution of the travel mode planning.

In contrast, when it is determined that the consumption energy total amount Es of all of the sections is larger than the sum of the remaining charge of the battery 110 and the first allowance value Ea (step S13: YES), the execution determiner 124a determines to execute the travel mode planning (step S14), and ends the determination on the execution of the travel mode planning Next, an example of the travel mode planning process by the driving support 124 will be described with reference to FIG. 4.

Figure 4:
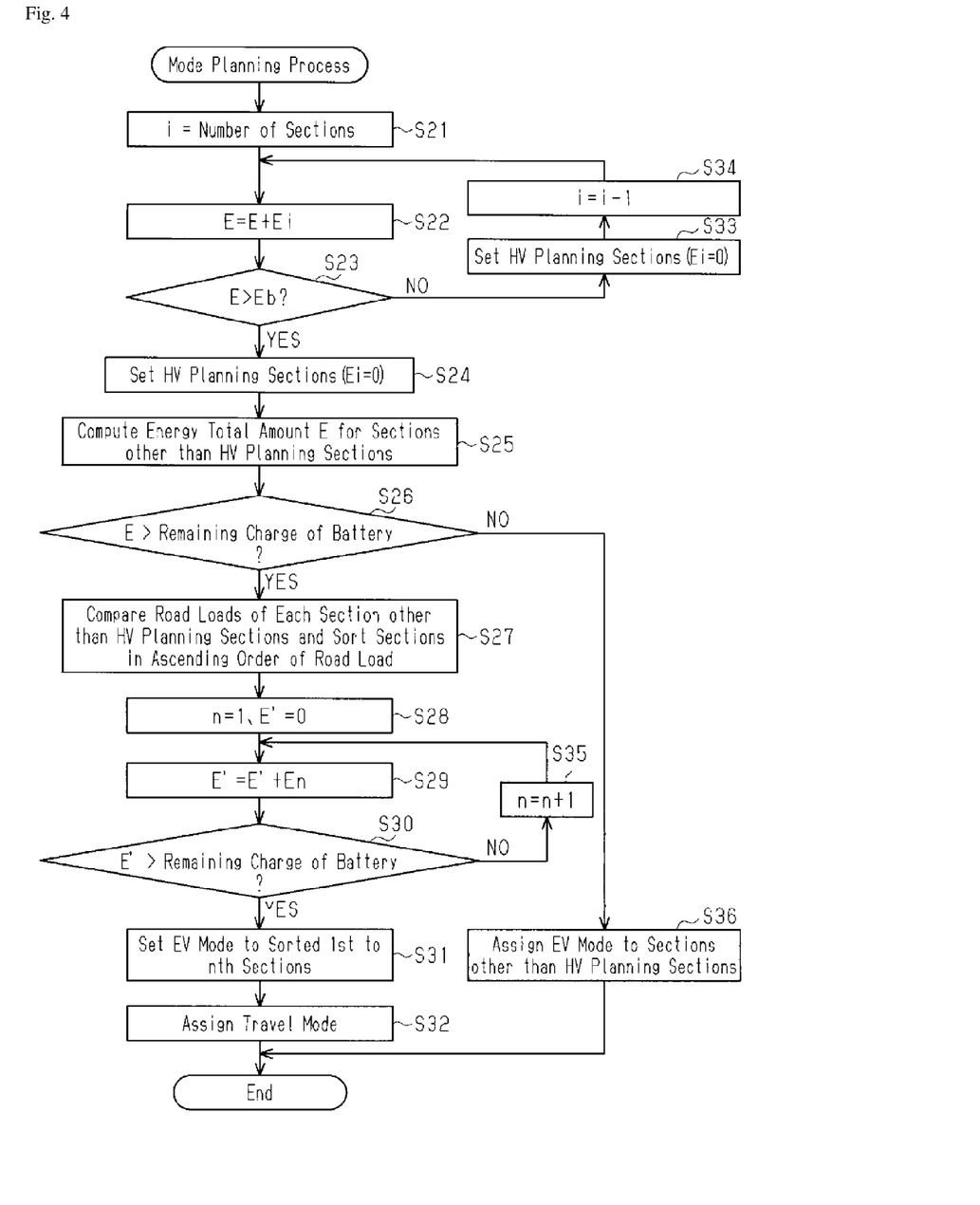
FIG. 4 is a flowchart showing a travel mode planning process by the travel support device of the embodiment.

As shown in FIG. 4, the mode planner 124b of the driving support 124 defines the total number of sections as i (step S21), and defines the sum of the consumption energy of sections including i-th section from the destination Pb as (E=E+Ei), where the consumption energy E=0 (step S22). The mode planner 124b determines whether or not the sum E of the consumption energy from the destination Pb to the i-th section is larger than the second allowance value Eb (step S23). In a case of determining that the sum E of the consumption energy from the destination Pb to the i-th section is not larger than the second allowance value Eb (step S23: NO), the mode planner 124b sets i=i−1 so that a section adjacent to the i-th section is integrated (step S34) and proceeds to step S22.

In contrast, in a case of determining that the sum E of the consumption energy from the destination Pb to the i-th section is larger than the second allowance value Eb (step S23: YES), the mode planner 124b does not execute integration to the i-th section, and sets the section travel mode from the destination Pb to the i-th section to the HV mode, and sets the consumption energy as Ei=0 (step S24).

Next, the mode planner 124b computes the total amount E of the consumption energy other than the sections of which the travel mode was set to the HV mode (step S25). Then, the mode planner 124b determines whether or not the total amount E of the consumption energy other than the sections of which the travel mode was set to the HV mode is larger than the remaining charge of the battery 110 (step S26). In a case of determining that the total amount E of the consumption energy other than the sections of which the travel mode was set to the HV mode is not larger than the remaining charge of the battery 110 (step S26: NO), the mode planner 124b assigns the EV mode as the travel mode of the sections other than the sections of which the travel mode was planned to be the HV mode (step S36) and ends the travel mode planning Further, in a case of determining that the total amount E of the consumption energy other than the sections of which travel mode was planned to be the HV mode is larger than the remaining charge of the battery 110 (step S26: YES), the mode planner 124b compares the road loads of the sections other than the HV-planned sections, and sort the sections in an ascending order of the road loads (step S27). The mode planner 124b sets a section n=1, and consumption energy E'=0 (step S28), and computes the sum (E'=E'+E'n) of the section consumption energy up to the section n (step S29).

Next, the mode planner 124b determines whether or not that the sum E' of the section consumption energy up to the section n is larger than the remaining charge of the battery 110 (step S30). In a case of determining that the sum E' of the section consumption energy up to the section n is equal to or less than the remaining charge of the battery 110 (step S30: NO), the mode planner 124b sets n=n+1 so as to increment a section (step S35).

On the other hand, in a case of determining that the sum E' of the section consumption energy up to the section n is larger than the remaining charge of the battery 110 (step S30: YES), the mode planner 124b sets the travel modes of the 1st to n-th sections, which have been sorted, to the EV mode (step S31). Then, the mode planner 124b assigns a travel mode to each section of the travel route (step S32), and ends the travel mode planning In the present embodiment, as mentioned above, the first allowance value Ea, which is used by the execution determiner 124a for the determination, is set to a larger value than the second allowance value Eb, which is used by the mode planner 124b for the planning Due to this, in the determination of whether or not to execute the travel mode planning, the determination is made such that the remaining charge of the battery 110 can be used up by the first allowance value Ea having the relatively large value. Further, in the travel mode planning, the remaining charge of the battery 110 is planned to be used up in the vicinity of the destination Pb by the second allowance value Eb that is relatively small. Accordingly, a travel support device, the travel support method, and the drive support system that is capable of promoting the appropriation of the battery consumption in the travel route can be provided.

As described above, according to the present embodiment, the following advantages can be achieved.

(1) The energy corresponding to the first allowance value Ea used in the determination on whether or not to execute the travel mode planning is estimated to be larger than energy corresponding to the second allowance value Eb used in the travel mode planning. In other words, the energy (Es−Ea) of the entire travel route used for the determination becomes smaller than the energy (Es−Eb) of the entire travel route used in executing the travel mode planning. That is, since the travel mode planning is executed with the relatively large consumption energy, the consumption of the battery 110 is carried out, and the battery 110 is used up at a location close to the destination Pb. Thus, the appropriation of the consumption of the battery 110 in the travel route can be promoted.

(2) The travel modes of the one or more sections close to the destination Pb having the consumption energy sum E smaller than the second allowance value Eb are planned to be the HV mode, and the travel mode planning is executed for other sections, so the remaining charge of the battery 110 can be used up before reaching the sections immediately before the destination Pb.

(3) The driving of the vehicle can be supported in the vehicle 100 having the plurality of travel modes, while promoting the appropriation of the consumption of the battery 110 in the travel route.

The above embodiment may be modified according to the following configurations.

In the above embodiment, the execution of the travel mode planning is determined by using the first allowance value Ea, and the travel mode is planned by using the second allowance value Eb. However, the execution of the travel mode planning may be determined by using the energy (Es−Ea) that is set to the entire travel route, and the travel mode may be planned by using the energy (Es−Eb) that is set to the entire travel route In the above embodiment, the first allowance value Ea and the second allowance value Eb are defined as corresponding to energy, however, the first allowance value Ea and the second allowance value Eb may correspond to distances. That is, the mode planning execution determination may be performed by the distance corresponding to the first allowance value Ea, and the travel mode may be planned by the distance corresponding to the second allowance value Eb. In this case, the mode planning execution determination and the travel mode planning may be performed by changing the lengths of sections corresponding to distances.

In the above embodiment, the case in which the on-vehicle network is CAN is described. However, the invention is not limited to this, and the on-vehicle network may consist of any network, such as Ethernet (registered trademark), FlexRay (registered trademark), or IEEE 1394 (FireWire (registered trademark)), as long as it can connect the electronic components such as the ECU in a communicable manner. Further, it may be configured by including a CAN and having other networks combined thereto. This improves the flexibility of configuration in the vehicle in which the travel support device is used.

In the above embodiment, the case in which the navigation system 112 and the driving support 124 are different configurations is described. However, the invention is not limited to this, and the navigation system and the drive supporting section may be provided in the same device. This improves the flexibility of configuration in the travel support device.

In the above embodiment, the case in which the hybrid controller 108 and the driving support 124 are different configurations is described. However, the invention is not limited to this, and the hybrid controller and the drive supporting section may be provided in the same device. This improves the flexibility of configuration in the travel support device.

In the above embodiment, the case in which the respective devices such as the navigation system 112, the display 113, and the on-vehicle controller 120 are provided integrally in the vehicle 100 is described. However, the invention is not limited to this, and a portable information processing device and the like such as a cell phone or a smartphone as an entirety or a part of such functions may be used, so long as the respective devices such as the navigation system, the display, and the on-vehicle controller are connected to each other in a communicable manner. This improves the flexibility of design of the travel support device.

In the above embodiment, the case in which the driving support 124, the navigation system 112, the map information database 111, and the like are installed in the vehicle 100 is described. However, the invention is not limited to this, and a part of functions such as the drive supporting section, the navigation system, and the map information database may be provided in an information processor outside the vehicle, or in a portable information processing device. As an information processing device outside the vehicle, an information processing center may be exemplified, and as a portable information processor, a terminal such as a cell phone, or a smartphone can be exemplified. As with the information processor outside the vehicle, information may be received via a wireless communication line. As with the portable information processor, it may connect to the on-vehicle network, may be connected by a shortrange communication, or may transmit and receive information via the wireless communication line. This improves the flexibility of design of the travel support device.

In the above embodiment, the case in which the road loads of the sections in the travel route are acquired or computed from the information included in the map information database is described. However, the invention is not limited to this, and the road loads of the sections in the travel route may be acquired or computed from a learning database. For example, for a route that had once been traveled, the road loads required in the route stored in the learning database may be utilized. This improves the flexibility of design of the travel support device.

In the above embodiment, the case in which the EV mode is assigned in the ascending order of road load for each section is described. However, the invention is not limited to this, and the EV mode may be assigned to the respective sections by making a determination based on one or more pieces of information included in the map data such as road gradients, legal speed limits, and road types, so long as the assignment of the EV mode can suitably be performed. Further, the EV mode may be assigned to the respective sections based on internal combustion engine efficiency or battery efficiency. This improves the flexibility of design of the travel support device.

In the above embodiment, the case in which the travel mode planning is executed by the driving support 124 is described. However, the invention is not limited to this, and the travel mode planning may be executed in a hybrid controller and the like. This improves the flexibility of design of the travel support device.

In the above embodiment, primarily the case in which the travel mode planning is executed when the location of the vehicle 100 is at the current location Pa is described, however, the travel mode planning may be executed at any location along which the vehicle 100 is moving toward the destination. Further, the appropriate travel mode planning can be executed for all of the sections in the travel route regardless of where the execution takes place. This improves the flexibility of design of the travel support device.

The invention claimed is:

1. A travel support device that supports a vehicle having an internal combustion engine and a motor, which uses a battery, as drive sources to move from a current location to a destination, wherein
   a travel route from the current location to the destination is divided into a plurality of sections,
   travel modes of the vehicle include an EV mode, which uses the motor as the drive source, and an HV mode, which uses at least the internal combustion engine as the drive source,
   a road load for traveling each section in the EV mode is set, the travel support device comprising:
- a mode planner that plans, for each section, the travel mode by selecting one of the EV mode and the HV mode; and
- an execution determiner that determines to execute a travel mode planning with the mode planner on condition that a total amount of consumption energy required for traveling the travel route is larger than an energy equivalent value that is obtained by adding a first allowance value to a remaining charge of the battery,
- wherein, in executing a planning based on the determination by the execution determiner, the mode planner executes the travel mode planning while assuming that energy from which energy corresponding to a second allowance value, which is smaller than the first allowance value is excluded, is energy required for travelling the travel route.

2. The travel support device according to claim 1, wherein, if, in one or more sections close to the destination, there is a section where the sum of consumption energy upon traveling in the EV mode is smaller than energy corresponding to the second allowance value, the mode planner plans a travel mode of such a section to be in the HV mode and executes travel mode planning for the other sections to select the EV mode or the HV mode.

3. The travel support device according to claim 1, wherein
- the travel support device is a part of a drive support system that supports driving of a vehicle based on one travel mode selected from among a plurality of different travel modes planned for each of a plurality of sections that are obtained by dividing the travel route from the current location to the destination of the vehicle including an internal combustion engine and a motor as drive sources, and
- the travel support device plans one travel mode selected from among the plurality of travel modes for each section in the travel route.

4. A travel support method for supporting a movement of a vehicle having an internal combustion engine and a motor, which uses a battery, as drive sources from a current location to a destination, wherein
- a travel route from the current location to the destination is divided into a plurality of sections,
- travel modes of the vehicle include an EV mode, which uses the motor as the drive source, and an HV mode, which uses at least the internal combustion engine as the drive source,
- a road load for traveling each section in the EV mode is set, the travel support method comprising:
- planning the travel mode by selecting one of the EV mode and the HV mode:
- prior to the planning the travel mode, determining to execute a travel mode planning on condition that a total amount of consumption energy required for traveling the travel route is larger than an energy equivalent value that is obtained by adding a first allowance value to a remaining charge of the battery; and
- in executing a planning based on the condition, executing the travel mode planning while assuming that energy from which energy corresponding to a second allowance value, which is smaller than the first allowance value is excluded, is energy required for travelling the travel route.

5. The travel support method according to claim 4, wherein, if, in one or more sections close to the destination, there is a section where the sum of consumption energy upon traveling in the EV mode is smaller than energy corresponding to the second allowance value, the planning the travel mode includes
- planning a travel mode of such a section to be in the HV mode and
- executing a travel mode planning for the other sections to select the EV mode or the HV mode.

6. A drive support system that supports driving of a vehicle based on one travel mode selected from among a plurality of different travel modes, the selected mode having been planned for each of a plurality of sections that are obtained by dividing a travel route from a current location to a destination of the vehicle including an internal combustion engine and a motor as drive sources, the drive support system comprising:
- the travel support device according to claim 1 as a travel support device for planning the one travel mode selected from among the plurality of travel modes for each section of the travel route.

* * * * *